United States Patent
Kuhnle et al.

(10) Patent No.: US 8,695,636 B2
(45) Date of Patent: Apr. 15, 2014

(54) ONE PIECE DOUBLE MEMBRANE DIAPHRAGM VALVE

(75) Inventors: Daniel Kuhnle, Ilsfeld-Wuestenhausen (DE); Stefan Pfund, Winnenden (DE)

(73) Assignee: Norgren GmbH, Alpen (DE)

( * ) Notice: Subject to any disclaimer, the term of this patent is extended or adjusted under 35 U.S.C. 154(b) by 1032 days.

(21) Appl. No.: 12/281,061

(22) PCT Filed: Mar. 15, 2006

(86) PCT No.: PCT/EP2006/002377
§ 371 (c)(1),
(2), (4) Date: Aug. 28, 2008

(87) PCT Pub. No.: WO2007/104333
PCT Pub. Date: Sep. 20, 2007

(65) Prior Publication Data
US 2009/0014077 A1  Jan. 15, 2009

(51) Int. Cl.
*F16K 11/048* (2006.01)
*F15B 13/042* (2006.01)

(52) U.S. Cl.
USPC .............. 137/625.27; 137/102; 137/625.5; 137/625.66

(58) Field of Classification Search
USPC ........... 137/625.5, 625.6, 625.66, 15.21, 102, 137/315.09, 625.27; 251/61.1
See application file for complete search history.

(56) References Cited

U.S. PATENT DOCUMENTS

| | | | |
|---|---|---|---|
| 3,329,165 A * | 7/1967 | Lang | 137/625.5 |
| 3,528,455 A | 9/1970 | Krueuter et al. | |
| 3,650,181 A | 3/1972 | Parr | |
| 3,741,247 A * | 6/1973 | Kaemmer | 137/625.66 |
| 3,762,443 A * | 10/1973 | Sorenson | 137/625.66 |
| 3,768,515 A | 10/1973 | Trusselle | |
| 3,774,637 A * | 11/1973 | Weber et al. | 137/625.66 |
| 3,902,516 A * | 9/1975 | Rudolph | 137/102 |
| 4,161,190 A * | 7/1979 | Moller et al. | 137/625.66 |
| 4,214,601 A * | 7/1980 | Sama | 137/102 |
| 5,161,775 A * | 11/1992 | Miller | 251/30.05 |
| 5,361,803 A * | 11/1994 | Stoll | 137/625.66 |
| 6,098,622 A * | 8/2000 | Nobile et al. | 128/205.24 |
| 6,354,813 B1 * | 3/2002 | Laing | 417/291 |

FOREIGN PATENT DOCUMENTS

| | | |
|---|---|---|
| GB | 993971 A | 6/1965 |
| GB | 2023258 A | 12/1979 |
| GB | 2385108 A | 8/2003 |

* cited by examiner

Primary Examiner — John Rivell
(74) Attorney, Agent, or Firm — The Ollila Law Group LLC

(57) ABSTRACT

A one piece double membrane diaphragm including an upper (308) and lower diaphragm membrane (310) joined together by a central section (312) is provided. The upper diaphragm membrane (308) seals against a top sealing surface (222) when the diaphragm is in a first position. The lower diaphragm membrane (310) seals against a bottom sealing surface (224) when the diaphragm is in a second position. The diaphragm may also be made from a resilient material and shaped in such a way as to create a spring force holding the diaphragm into a default position in the valve.

12 Claims, 4 Drawing Sheets

ONE PIECE DOUBLE MEMBRANE DIAPHRAGM VALVE

RELATED APPLICATIONS

This application is related to applications "A rocker type diaphragm valve" and "A springy diaphragm in a diaphragm valve" filed on the same day as this application and hereby included by reference into this application.

BACKGROUND OF THE INVENTION

1. Field of the Invention

The invention is related to the field of valves, and in particular, to an improved diaphragm valve.

2. Description of the Prior Art

Diaphragm valves typically use a double membrane diaphragm design. Double membrane diaphragm designs typically contain a top and bottom diaphragm membrane attached to a central spindle and held in place by a top and bottom retaining part. The central spindle may also be fabricated from a number of parts. Each interface between the different parts is a potential leak point for the valve. The large number of parts needed for each diaphragm may increase manufacturing cost and inventory cost.

Therefore there is a need for a double membrane diaphragm fabricated in one piece.

SUMMARY OF THE INVENTION

A one piece double membrane diaphragm is disclosed. The double membrane diaphragm has an upper and lower diaphragm membrane joined together by a central section. The upper diaphragm membrane is configured to seal against a top sealing surface when the diaphragm is in a first position. The lower diaphragm membrane is configured to seal against a bottom sealing surface when the diaphragm is in a second position. An upper rim may be attached to the upper diaphragm membrane where the upper rim is configured to help hold the upper diaphragm membrane into the valve. A lower rim may be attached to the lower diaphragm membrane where the lower rim is configured to help hold the lower diaphragm membrane into the valve. The diaphragm may also be made from a resilient material and shaped in such a way as to create a spring force holding the diaphragm into a default position in the valve.

DETAILED DESCRIPTION OF THE PREFERRED EMBODIMENT

Figure 2:
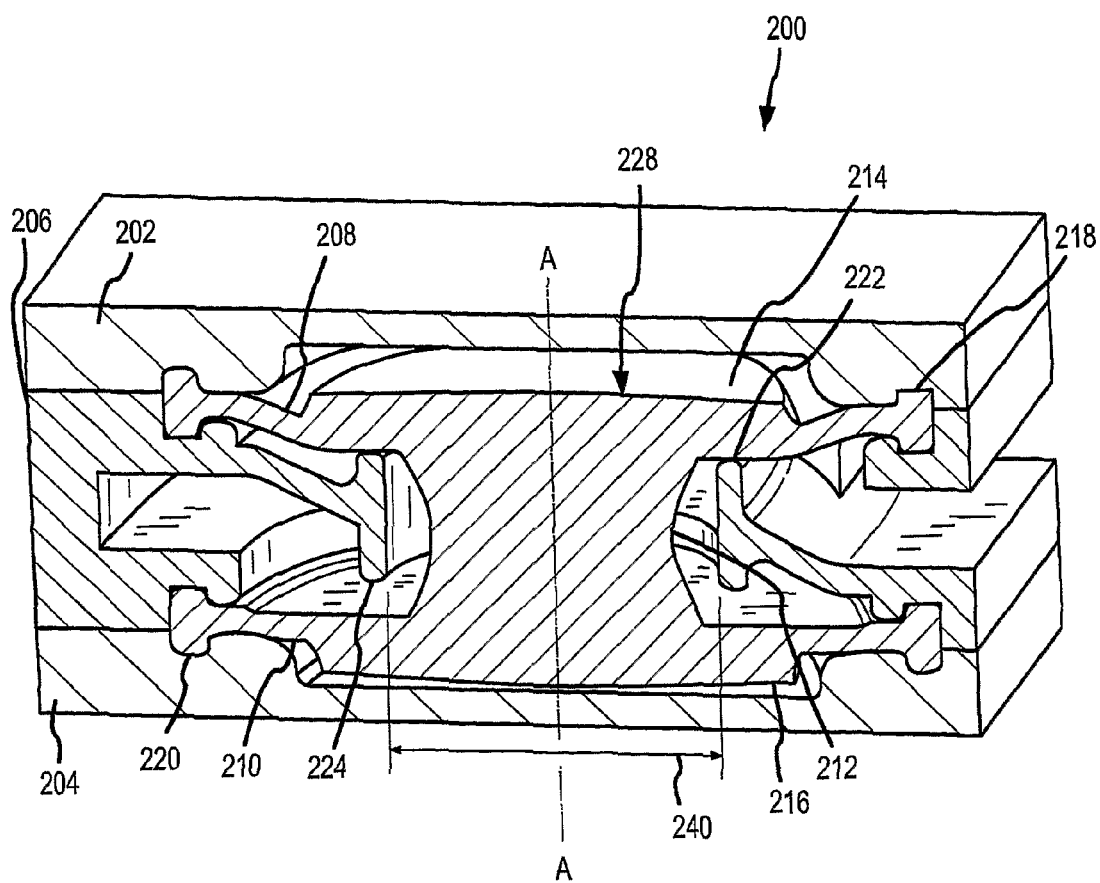
FIG. 2 is an isometric sectional view of a diaphragm valve 200 in an example embodiment of the invention.
Figure 3C:
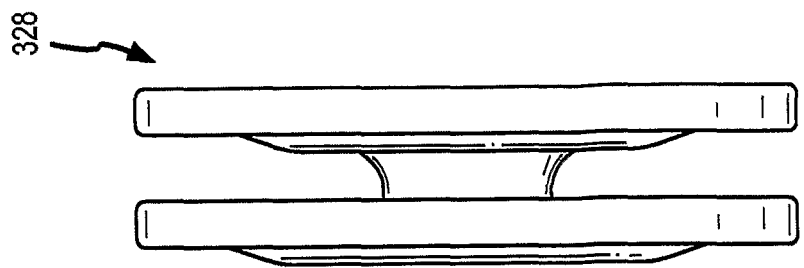
FIG. 3 is a drawing of diaphragm 328 in an example embodiment of the invention.
Figure 3A:
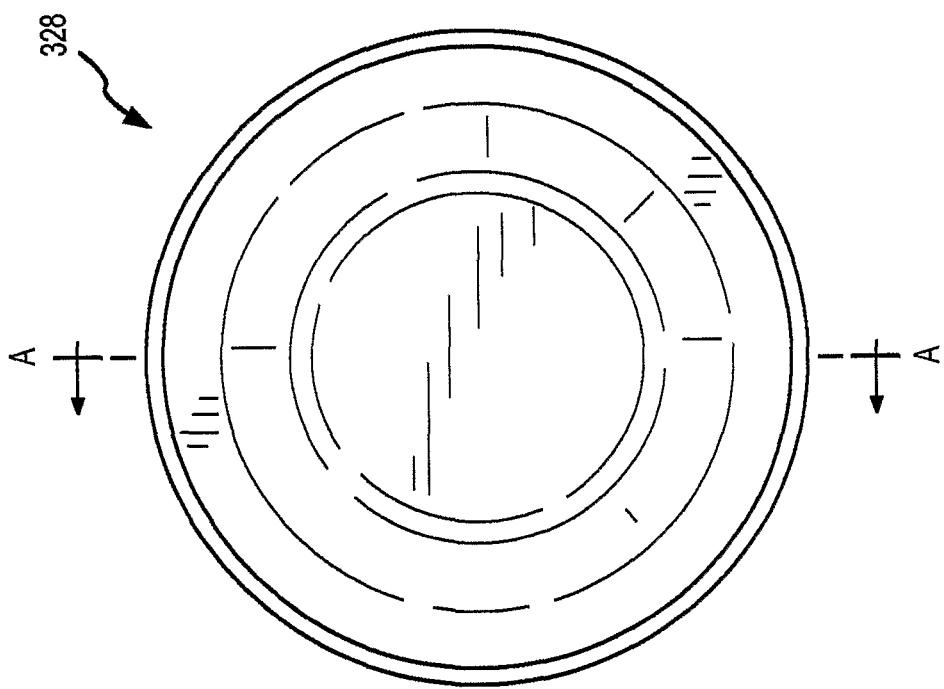
Figure 3B:
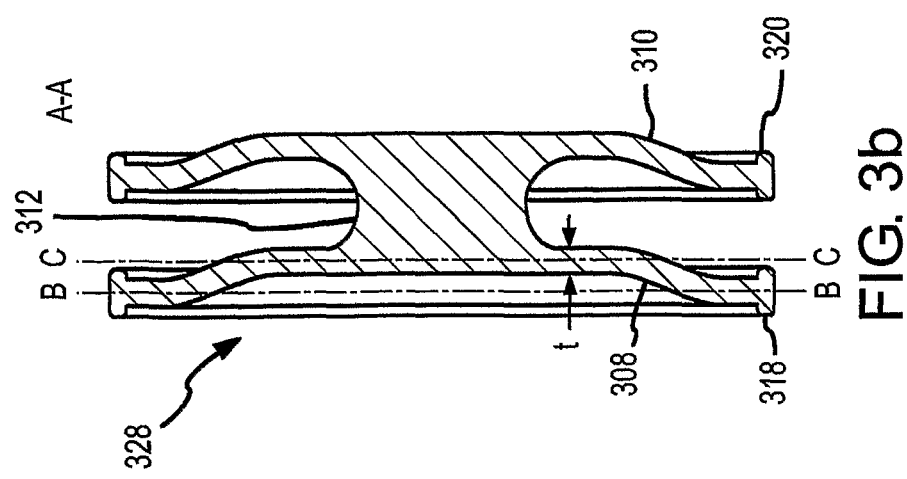
Figure 4:
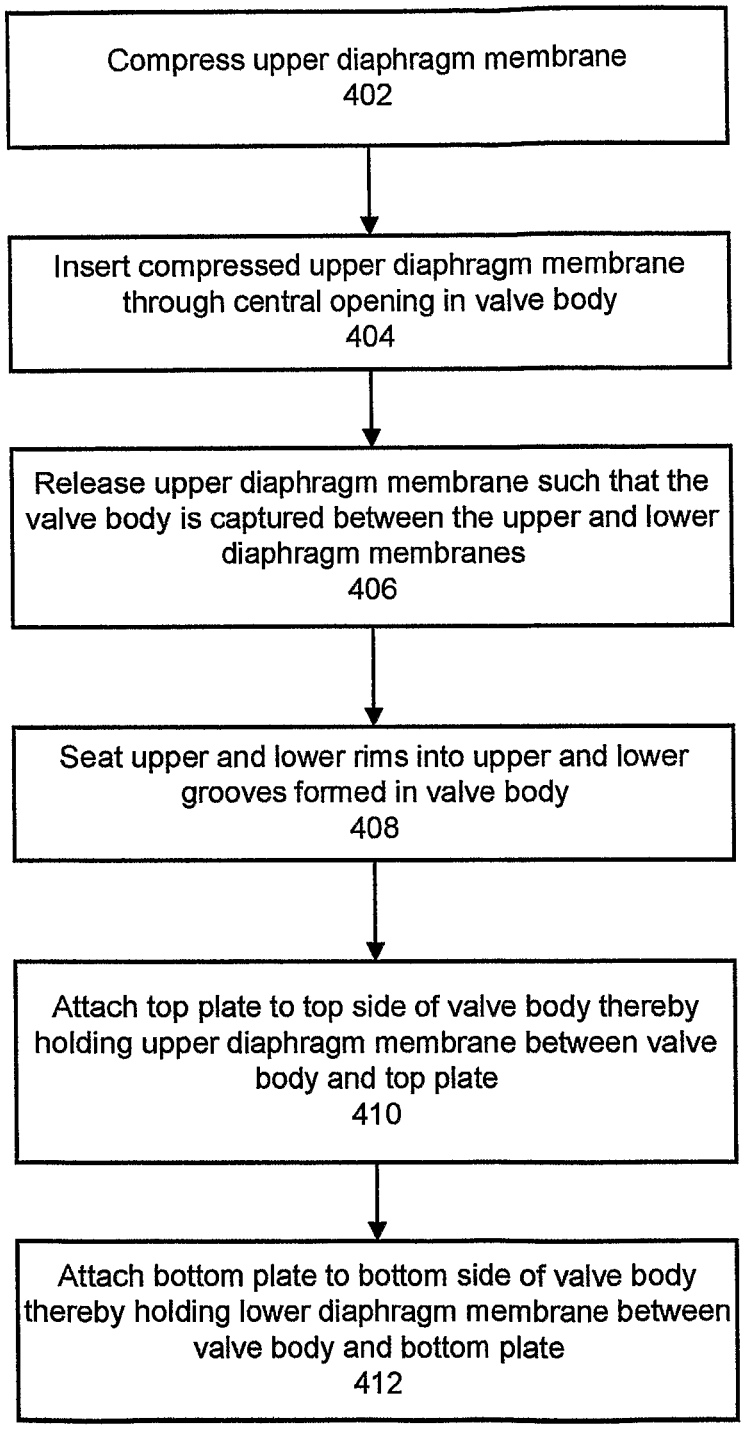
FIG. 4 is a flow chart for assembling a diaphragm valve in an example embodiment of the invention.

FIGS. 2-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
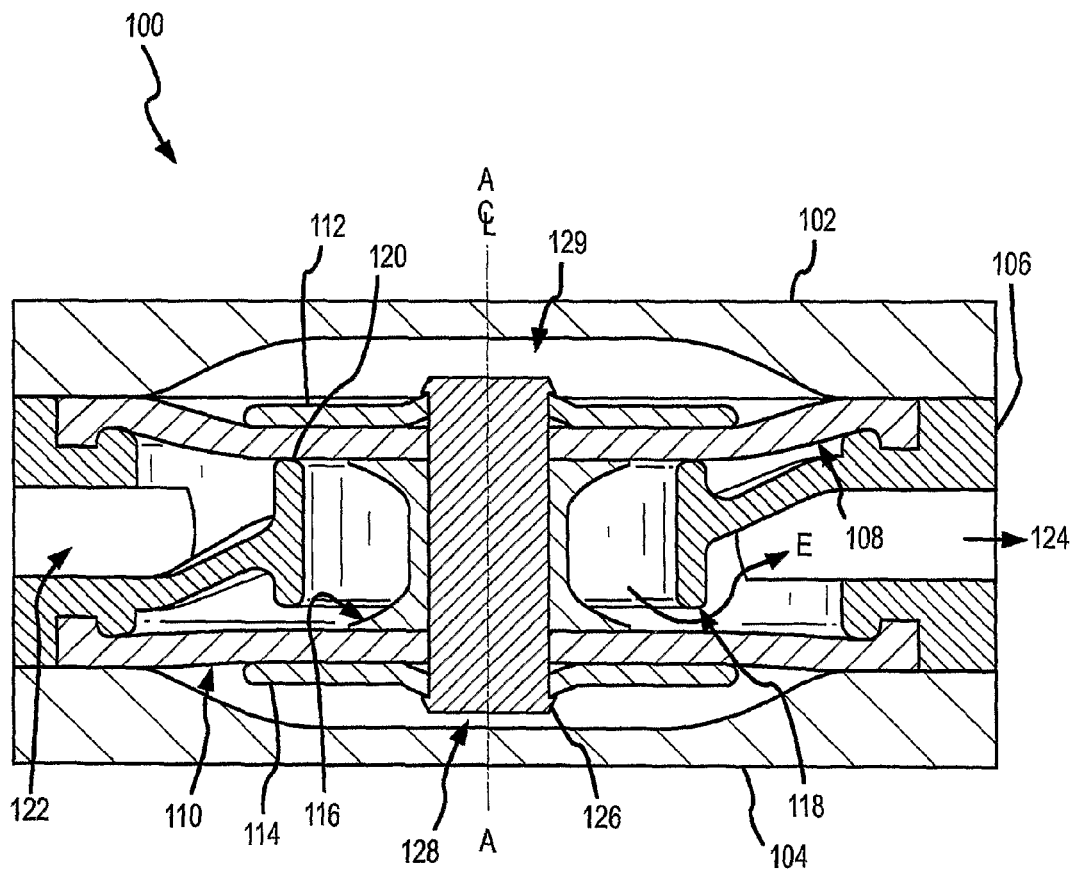
FIG. 1 is a cross sectional view of a typical prior art diaphragm valve 100.

FIG. 1 is a cross sectional view of a typical diaphragm valve 100. Diaphragm valve 100 comprises top plate 102, bottom plate 104, valve body 106, top diaphragm disk 108, bottom diaphragm disk 110, top retaining ring 112, bottom retaining ring 114, spacer 116, center spool 126, upper sealing surface 120, lower sealing surface 118, inlet opening 122 and exhaust 124. A diaphragm assembly is comprised of top diaphragm disk 108, bottom diaphragm disk 110, top retaining ring 112, bottom retaining ring 114, spacer 116 and center spool 126. The parts in the diaphragm assembly are generally circular in nature and are symmetric about center line AA. Top plate 102 is attached to valve body 106 capturing top diaphragm disk 108 in a gap between the top plate 102 and valve body 106. Bottom plate 104 is attached to valve body 106 capturing bottom diaphragm disk 110 in a gap between the bottom plate 104 and valve body 106. Upper and lower sealing surfaces are generally circular in nature with each sealing surface formed in a plane. The sealing surfaces may also be called valve seats. The two planes containing the two sealing surfaces are generally parallel to each other.

Valve 100 is shown in the off or closed position with top diaphragm disk 108 contacting upper sealing surface 120 and having a gap between bottom diaphragm disk 110 and lower sealing surface 118. The gap between the bottom diaphragm disk 110 and the lower sealing surface is uniform in height. In the closed position fluid from an outlet opening (not shown) flows through the gap between the bottom diaphragm disk 110 and lower sealing surface 118 and out through exhaust 124 (as shown by arrow E). In the on position the central part of the diaphragm assembly is shifted upward such that the bottom diaphragm disk 110 contacts lower sealing surface 118 and a gap is formed between top diaphragm disk 108 and upper sealing surface 120. The gap between the top diaphragm disk 108 and the upper sealing surface is uniform in height. In the on position, fluid flows from inlet opening 122 through the gap between top diaphragm disk 108 and upper sealing surface 120, into an outlet opening (not shown). The two diaphragm disks flex or deform as the central part of the diaphragm assembly is shifted between the open and closed positions. There is generally radial symmetry in the deformation of the two diaphragm disks. The radial symmetry forms concentric circles of constant deflection in the two diaphragm disks. In different valve configurations, the inlet opening 122 may be used as an exhaust port and the exhaust 124 may be used as an inlet opening.

FIG. 2 is an isometric sectional view of a diaphragm valve 200 in an example embodiment of the invention. Diaphragm valve 200 comprises top plate 202, bottom plate 204, valve body 206 and diaphragm 228. Diaphragm 228 has upper diaphragm membrane 208, lower diaphragm membrane 210, center section 212, upper rim 218, lower rim 220, top stiffener 214 and bottom stiffener 216. Diaphragm 228 is fabricated as one piece. In one example embodiment, diaphragm 228 is generally circular in shape. In other example embodiments of the invention, diaphragm 228 may be oval or rectangular in shape. In one example embodiment of the invention, diaphragm 228 is molded. In another example embodiment of the invention, diaphragm 228 is machined from a block of material. Diaphragm 228 is fabricated from a resilient material or a combination of resilient materials, for example rubber, polyurethane, or the like.

The upper diaphragm membrane 208 and lower diaphragm membrane 210 are joined together by the central diaphragm section 212. In one example embodiment of the invention, diaphragm 228 is symmetric with respect to axis AA. Top stiffener 214 is formed on the top side of upper diaphragm membrane and configured to stiffen upper diaphragm membrane. Bottom stiffener 216 is formed on the bottom side of lower diaphragm membrane and configured to stiffen lower diaphragm membrane. Top and bottom stiffeners (214 and 216) may not be needed and are optional. A top sealing surface (also called a top valve seat) 222 and bottom sealing surface (also called a bottom valve seat) 224 are formed in valve body 206. In one example embodiment of the invention, each sealing surface or valve seat is formed in one plane. The top sealing surface 222 and the bottom sealing surface 224 generally surround a central opening 240 in the valve body 206. In one example embodiment of the invention, the planes containing the top and bottom valve seats are generally parallel to each other. In another example embodiment of the invention, the planes containing the top and bottom valve seats are generally not parallel to each other.

Top plate 202 is attached to valve body 206, capturing upper diaphragm membrane 208 in a gap between top plate 202 and valve body 206. Bottom plate 204 is attached to valve body 206, capturing lower diaphragm membrane 210 in a gap between bottom plate 204 and valve body 206. In one example embodiment of the invention, top plate 202 and bottom plate 204 are attached to valve body by laser welding. Any other attachment method may be used to attach the top and bottom plates to valve body 204. In one example embodiment of the invention, top rim 218 is formed around the outer edge of upper diaphragm membrane 208 and is configured to fit into a groove formed between the top plate 202 and the top side of valve body 206. Top rim 218 holds upper diaphragm membrane in place and forms a seal between the diaphragm and the valve. Bottom rim 220 is formed around the outer edge of lower diaphragm membrane 210 and is configured to fit into a groove formed between the bottom plate 204 and the bottom side of valve body 206. Bottom rim 220 holds lower diaphragm membrane in place and forms a seal between the diaphragm and the valve. The top and bottom rims on the two diaphragm membranes are optional. Other methods may be used to hold the diaphragm membranes into the valve. For example, a groove or channel may be formed in the outer edge of the diaphragm membrane and a lip or bead may be formed on the top plate that fits into the groove.

In operation, diaphragm 228 moves between two positions, an upper position and a lower position. The deflection of diaphragm 228 is generally radially symmetric about the center of diaphragm 228 (axis AA). In the upper diaphragm position (not shown), lower diaphragm membrane 210 contacts and seals against the bottom sealing surface 224. Upper diaphragm membrane 208 is positioned away from top sealing surface 222, leaving a gap between the upper diaphragm membrane 208 and the top sealing surface 222. In the lower diaphragm position, upper diaphragm membrane 208 contacts and seals against the top sealing surface 222. Lower diaphragm membrane 210 is positioned away from bottom sealing surface 224, leaving a gap between the lower diaphragm membrane 210 and the bottom sealing surface 224.

Diaphragm 228 is typically moved between the upper position and the lower position using an activation force created by pressure from a pilot fluid (not shown). The pilot fluid is introduced into the gap between the upper diaphragm membrane 208 and the top plate 202 to force diaphragm 228 into the lower position. The pilot fluid is introduced into the gap between the lower diaphragm membrane 210 and the bottom plate 204 to force diaphragm 228 into the upper position. When there is no activation force applied to either area, diaphragm 228 may be configured to snap or return to a default position. The diaphragm 228 may be configured such that the default position is either the upper diaphragm position or the lower diaphragm position. In some cases, the spring force may not be strong enough to return the diaphragm to the default position if the source supply is still active. Typically, the source supply is also used for the control supply, so when there is no pressure into the valve, both the control and the source will be inactive and the diaphragm will return to the default position. The method used to move the diaphragm between the upper and lower position is not important and other methods besides a pilot fluid may be used, for example a plunger activated by a coil and attached to the diaphragm.

In one example embodiment of the invention, diaphragm 228 is made from a resilient material, for example polyurethane. The resilient material allows diaphragm 228 to be assembled into the valve such that the resilient diaphragm material and the shape of diaphragm 228 interacting with the valve enclosure creates a spring force that returns diaphragm 228 to a default position. In one example embodiment of the invention, the upper diaphragm membrane 208 has a bowl or dish shape such that when the diaphragm is installed into the valve, the upper diaphragm membrane forces the diaphragm into the lower position when there is no pressure into the valve. In another example embodiment of the invention, both the upper and lower diaphragm membranes have a bowl or dish shape such that when the diaphragm is installed into the valve, the two diaphragm membranes force the diaphragm into the lower position.

FIG. 3 is a drawing of diaphragm 328 in an example embodiment of the invention. FIG. 3a is a top view of diaphragm 328, in an example embodiment of the invention. FIG. 3b is a sectional view AA from top view 3a, in an example embodiment of the invention. Diaphragm 328 comprises upper diaphragm membrane 308, lower diaphragm membrane 310, center section 312, upper rim 318 and lower rim 320. In one example embodiment, diaphragm 328 is generally circular in shape. In other example embodiments of the invention, diaphragm 328 may be oval or rectangular in shape. Other shapes are also possible. Upper diaphragm membrane 308 is attached to lower diaphragm membrane 310 by center section 312 that holds the two diaphragm membranes in a spaced apart relationship. In one example embodiment of the invention, upper diaphragm membrane is generally parallel with lower diaphragm membrane 310. In another example embodiment of the invention, upper diaphragm membrane is not parallel with lower diaphragm membrane 310. In one example embodiment of the invention the upper and lower rims are generally circular in shape. In other example embodiments of the invention, the rims may be oval or rectangular in shape. The upper and lower rims (318 and 320) are configured to fit into a gap between the top plate and the valve body and the bottom plate and the valve body. The rims help hold diaphragm 328 in place in the valve and create a seal between diaphragm 328 and the valve. The upper and lower rims on the two diaphragm membranes are optional. Other methods may be used to hold the diaphragm membranes into the valve. For example, a groove or channel may be formed in the outer edge of the diaphragm membrane and a lip or bead may be formed on the top plate or on the valve body that fits into the groove. Upper diaphragm membrane 308 is coupled to upper rim 318 along the inner diameter of upper rim 318. Lower diaphragm membrane 310 is coupled to lower rim 320 along the inner diameter of lower rim 320. Diaphragm 328 is fabricated in one piece. Upper diaphragm membrane 308 has thickness t. Upper diaphragm membrane 308 has a bowl or dish shape. The outer edge of upper diaphragm membrane 308 is formed in essentially one plane shown as BB. The inner part of upper diaphragm membrane 308, where it joins with the central section 312, is formed in essentially one plane as shown by CC. Plane CC is offset, but generally parallel to plane BB. The offset between the inner and the outer areas of upper diaphragm membrane, the diaphragm membrane thickness t, and the diaphragm material generate the force that returns the diaphragm assembly to the first, or default, position when the diaphragm assembly is installed into the valve. In one example embodiment of the invention, lower diaphragm membrane also has a dish or bowl shape that is aligned in the same direction as the dish or bowl shape of the upper diaphragm membrane. In other example embodiments of the invention, lower diaphragm membrane may be flat or have a bowl shape that is not aligned with the upper diaphragm membrane.

FIG. 4 is a flow chart for assembling a diaphragm valve in an example embodiment of the invention. At step 402 the upper diaphragm membrane is compressed. At step 404 the compressed upper membrane is inserted through the central opening in the valve body. At step 406 the compressed upper diaphragm membrane is released such that the valve body is captured between the upper diaphragm membrane and the lower diaphragm membrane with the center section of the diaphragm located in the central opening in the valve body. Either the upper diaphragm membrane or the lower diaphragm membrane can be compressed and inserted through the central opening in the valve body. At optional step 408, an upper and lower rim is seated into an upper and lower groove respectively, where the upper and lower grooves are formed into a top and bottom surface of the valve body. At step 410 a top plate is attached to the top surface of the valve body holding the upper diaphragm membrane between the top plate and the valve body. At step 412 a bottom plate is attached to the bottom surface of the valve body holding the lower diaphragm membrane between the bottom plate and the valve body.

We claim:

1. A diaphragm valve, comprising:
a diaphragm (328) configured to be moved between a first and a second position along a stroke axis where the diaphragm comprises a center section (312), an upper diaphragm membrane (308) coupled to the center section (312) and extending radially out from the center section (312) and wherein a portion of the upper diaphragm membrane (308) extending radially out is configured to contact an upper valve seat (222), a lower diaphragm membrane (310) coupled to the center section (312) and extending radially out from the center section (312) and wherein a portion of the lower diaphragm membrane (310) extending radially out is configured to contact a lower valve seat (224), wherein the center section (312) couples the upper diaphragm membrane (308) to the lower diaphragm membrane (310) and holds the upper diaphragm membrane (308) in a spaced apart relationship with the lower diaphragm membrane (310), and where the diaphragm is fabricated from one piece upper and the upper diaphragm membrane (308) has a bowl shape that causes the diaphragm (328) to return to a default position when installed into the diaphragm valve.

2. The diaphragm valve of claim 1 where the upper diaphragm membrane (308) is formed in essentially a first plane and the lower diaphragm membrane (308) is formed in essentially a second plane and where the first plane is parallel to the second plane.

3. The diaphragm valve of claim 1 where the diaphragm (328) is made from a resilient material.

4. The diaphragm valve of claim 3 where the lower diaphragm membrane (310) has a bowl shape that is aligned with the bowl shape of the upper diaphragm membrane (308).

5. The diaphragm valve of claim 1 further comprising:
a valve body (206) forming a top sealing surface (222) and a bottom sealing surface (224);
the upper diaphragm membrane (208) configured to seal against the top sealing surface (222) when the diaphragm is in the first position; and
the lower diaphragm membrane (210) configured to seal against the bottom sealing surface (224) when the diaphragm is in the second position.

6. The diaphragm valve of claim 5 where the top and bottom sealing surfaces (222, 224) are between the upper diaphragm membrane (308) and lower diaphragm membrane (310).

7. The diaphragm valve of claim 5 further comprising:
a top plate (202) configured to be attached to a top side of the valve body (206) thereby capturing the upper diaphragm membrane (208) between the valve body (206) and the top plate (202); and
a bottom plate (204) configured to be attached to a bottom side of the valve body (206) thereby capturing the lower diaphragm membrane (210) between the valve body (206) and the bottom plate (204).

8. The diaphragm valve of claim 1 further comprising:
a top rim (318) attached to and surrounding the upper diaphragm membrane; and
a bottom rim (320) attached to and surrounding the lower diaphragm membrane.

9. The diaphragm valve of claim 1 where the diaphragm is essentially circular in shape.

10. The diaphragm valve of claim 1 where the stroke axis is concentric with a centerline of the diaphragm.

11. The diaphragm valve of claim 1 where the diaphragm is radially symmetric with respect to the stroke axis.

12. The diaphragm valve of claim 1 where the diaphragm is molded.

* * * * *